United States Patent [19]

Lerke et al.

[11] Patent Number: 5,030,288

[45] Date of Patent: Jul. 9, 1991

[54] ACTIVE MINERAL ADDITIVE TO BINDING MATERIALS

[76] Inventors: Pavel P. Lerke, ulitsa Lugovaya, 4, Chimkent; Berkimbai Parimbetov, ulitsa Baiseitovoi, 40, Alma-Ata; Vladimir F. Verner, ulitsa Rubinshteina, 54a; Valery V. Shnaider, mikroraion 17, 20, kv. 58, both of Chimkent; Shakhaidar S. Baiduisenov, ulitsa Dzhandosova, 21, Alma-Ata; Leonid M. Volozhin, ulitsa K. Marxa, 9, kv. 27, Chimkent; Boris G. Ryzhov, ulitsa Sovetskaya, 32a, kv. 3, Chimkent; Nikolai I. Malkov, ulitsa Iliicha, 4/5, kv. 8, Chimkent, all of U.S.S.R.

[21] Appl. No.: 460,130

[22] PCT Filed: Sep. 23, 1988

[86] PCT No.: PCT/SU88/00187

§ 371 Date: May 17, 1990

§ 102(e) Date: May 17, 1990

[87] PCT Pub. No.: WO90/03344

PCT Pub. Date: Apr. 5, 1990

[51] Int. Cl.$^5$ ................................................ C04B 7/14

[52] U.S. Cl. ...................................... 106/767; 106/741; 106/789

[58] Field of Search ............... 106/690, 695, 700, 714, 106/736, 741, 767, 789

[56] References Cited

FOREIGN PATENT DOCUMENTS 1159373 7/1969 United Kingdom .

OTHER PUBLICATIONS

Dialog Abstract-SU 893925, "Active Mineral Binder Additive Contains an Electrothermal Phosphoric Slag and Sodium Phosphate Used in Decorative Building Material Mfg", Verner et al, 2/10/82.

Primary Examiner—William R. Dixon, Jr.
Assistant Examiner—Paul Marcantoni
Attorney, Agent, or Firm—Ladas & Parry

[57] ABSTRACT

Active mineral additive to binding materials, consisting of granulated phosphatic slag 94–98% by mass and sulphate containing component 2–6% by mass, which is a mixture of sodium sulphate 47.2–57.6% by mass, magnesium sulphate 40.5–51.1% by mass and sodium rhodonite 1.7–1.9% by mass.

7 Claims, No Drawings

ACTIVE MINERAL ADDITIVE TO BINDING MATERIALS

FIELD OF THE INVENTION

The present invention relates to the production of binding materials and more particularly it relates to an active mineral additive for binding materials.

BACKGROUND ART

Known in the art is the production of cements that includes, apart from Portland cement clinker and gypsum, the additional use of active mineral additives, the weight fraction of which accounts for 5 to 60% by mass. Introduction of active mineral additives into cement makes it possible to cut down its cost and in some cases to modify the construction and engineering properties of cement (for instance cement hardening kinetics, heat release, setting periods, resistance to sulphates).

Both artificial and natural mineral additives can be used as active mineral additives in cement production. Natural mineral additives include: diatomite, tripolite, opoka, melilite marble aggregate. Artificial mineral additives include blast furnace and phosphatic slags.

Natural mineral additives have low whiteness and hydraulic activity, which the whiteness of Portland cement and its construction and engineering properties.

Known in the art is an active mineral additive, which is a heat treated mixture (at 1350°–1450° C.) of phosphatic slag (92–99% by mass) and sodium sulphate (1–8% by mass) (SU, A, 893925). The whiteness coefficient of such mineral active additives, according to the absolute scale, is considerably higher than that of natural mineral additives and amounts to 89–93% and the hydraulic activity of this additive determined by the amount of lime absorbed by the additive in 15 titrations is 22.9–23.8 mg.

Known in the art is also an active mineral additive, that is subjected to melting at 1350°–1450° C. mixture of phosphatic slag, sodium sulphate and magnesium sulphate.

The use of such mineral additive fails to considerably enhance the whiteness, and hydraulic activity of cement.

SUMMARY OF THE INVENTION

The present invention solves the problem of providing an active mineral additive, which ensures higher whiteness and hydraulic activity of the cement produced on the basis of this additive.

This object is attained by providing an active mineral additive to binding materials, comprising granulated phosphatic slag and a sulphate-containing component, according to the present invention, comprises as said sulphate containing component compries a mixture of sodium sulphate, 47.2–57.6% by mass, magnesium sulphate, 40.5–51.1% by mass, and sodium rhodonite 1.70–1.90% by mass. The following ratio of components are present in the mineral additive:

phosphatic slag—94–98% by mass
sulphate-containing mixture —2–6% by mass.

According to the present invention, the whiteness coefficient of the active mineral additive determined by the absolute scale is 96–100% and its hydraulic activity determined by the absorption of $Ca(OH)_2$ from lime solution after 15 titrations is 24.14–24.97 mg.

Further objects and advantages of the present invention will be understood from the following detailed description of the active mineral additive and examples of its production and use.

DETAILED DESCRIPTION

The active mineral additive for cement, according to the present invention, is a mixture of granulated phosphatic slag in an amount of 94–98% by mass and a sulphate-containing mixture in an amount of 2–6% by mass. The sulphate containing mixture comprises sodium sulphate (47.2–57.6% by mass), magnesium sulphate (40.5–51.1% by mass) and sodium rhodonite (1.7–1.9% by mass).

Phosphatic slag, which is the basic component of the mineral additive contained in the amount of 92–96% by mass, appears to be a product of electrothermal production of yellow phosphor.

In chemical composition phosphatic slag usually consists of 38–45% by mass of silicon oxide, 2–5% by mass aluminium oxide, 0.1–0.5% by mass of iron oxide, 38–52% by mass of calcium oxide, 2–5% by mass of magnesium oxide, 0.5–3.0% by mass of phosphorus oxide, 1–3% by mass of fluorine, 0.1–0.3% by mass of manganese oxide, 3.0–5.0% by mass of calcium, iron and manganese phosphides.

In mineralogical composition granulated slag consists of 80–95% by mass of vitreous phase of wolastonite composition and 7–10% by mass of wollastonite, 5–7% by mass of mililite, 3–5% by mass of okermanite. In crstallied state phosphatic slag consists of 60–70% by mass of wollastinite, 20–30% by mass of mililite, 10–15% by mass of okermanite and 10–20% by mass of cuspedine.

The sulphate-containing component of the active mineral additive, according to the present invention, consists of 47.2–57.6% by mass of sodium sulphate, 40.5–51.1% by mass of magnesium sulphate and 1.7–1.9% by mass of sodium rhodonite.

The sulphate-containing component in the indicated composition suitable, according to the present invention, for the active mineral additive can be produced both by blending the indicated components and through neutralization of effluents from nitron production.

The active mineral additive to binding materials, which is claimed in the present invention, may be produced either by introducing the indicated sulphate-containing component into melted phosphatic slag, subsequent mixing of the obtained composition and its introduction into water, or by mixing the indicated components of the additive, melting of the obtained composition at 1400°–1700° C. and subsequent pouring of the produced melt into water.

The sodium and magnesium sulphates contained in the sulphate-containing component react with iron and manganese sulphides and phosphides, present in phosphatic slag, to form slightly colored or colorless compounds, thereby enhancing the whiteness of the slag.

With decreased content of magnesium and sodium sulphates in the sulphate-containing component below the indicated level no complete chemical reaction with the above sulphides and phosphides of phosphatic slag occurs, thereby failing to result in the desired effect.

An increase in the content of magnesium and sodium sulphates in the sulphate-containing component above the indicated level is inexpedient, since this provides no rise of the whiteness coefficient.

Sodium rhodonite present in the sulphate-containing component, reacting with metal sulphides of phosphatic slag, forms readily volatile slightly colored components-iron and manganese rhodonites. The slag becomes whiter not only due to the formation of slightly colored iron and manganese rhodonites, but also due to the ability of sodium rhodonite to catalize the reaction of slag sulphides with sodium and manganese sulphates at a temperature of 1400°-1700° C.

The increase in the hydraulic activity of the active mineral additive according to the invention is explained by the fact that sodium rhodonite anion causes a dispersion of silicon-oxygen complexes —Si—O—Si in phosphatic slag, thereby leading to its accelerated hydration.

Experimentally it was found that the use of sulphate-containing mixture in the amount above 6% by mass is inexpedient, since no further increase in the whiteness of the additive occurs, but at the same time the sulphate-containing mixture affects the color stability of the additive to be obtained.

When sulphate-containing mixture is used in the amount below 2% by mass, no sufficient oxidation of metal sulphides occurs. Apart from this, the use of sulphate-containing component in the amount below 2% by mass, leads to the formation of a small amount of readily volatile and slightly colored compounds-metal rhodonites, thereby resulting in a decrease in the whiteness of the mineral additive.

According to the present invention, the whiteness coefficient of the active mineral additive determined by the absolute scale amounts to 96-100% and its hydraulic activity determined by the absorption of $Ca(OH)_2$ from lime solution after 15 titrations is 24.14-24.97 mg.

The active mineral additive according to the invention makes it possible to enhance the quality of white and decorative binding materials and cut down the cost of their production.

EXAMPLES

For a better understanding of the present invention specific examples of its embodiments are given hereinbelow by way of illustration.

EXAMPLE 1

Granulated phosphatic slag in the amount of 98 kg and a sulphate-containing component, which is a mixture consisting of sodium sulphate 47.2% by mass magnesium sulphate 51.1% by mass, sodium rhodonite 1.7% by mass, in the amount of 2 kg are blended and subjected to melting at 1400°-1470° C.

The obtained melt is allowed to stand for 30 minutes and thereafter is poured off into water.

The active mineral additive obtained as a result thereof had the whiteness coefficient of 96%. The hydraulic activity of the obtained additive determined by the absorption of $Ca(OH)_2$ from lime solution after 15 titrations is 24.6 mg.

On the basis of the active mineral additive obtained (10% by mass), white Portland cement clinker (85% by mass) with addition of gypsum (5% by mass) binding materials is produced having a compressive strength of 975 kgf/cm$^2$ (after 7 days of hardening) by joint grinding of the above components.

EXAMPLE 2

Under conditions similar to those described in Example 1, active mineral additive is produced from granulated phosphatic slag in the amount of 96.78 kg and sulphate-containing component, which is a mixture of sodium sulphate 57.6% by mass, magnesium sulphate 40.5% by mass and sodium rhodonite 1.9% by mass in the amount of 3.22 kg. The whiteness coefficient of the additive obtained is 96%. The hydraulic activity of the produced additive determined by the absorption of $Ca(OH)_2$ from lime solution after 15 titrations is 24.7 mg.

On the basis of the obtained active mineral additive (20% by mass), white Portland cement clinker (75% by mass) with addition of gypsum (5% by mass) binding materials are produced having a compression strength of 95 kgf/cm$^2$ (after 7 days of hardening) by joint grinding of the indicated components.

EXAMPLE 3

Under conditions similar to those described in Example 1, active mineral additive is produced from granulated phosphatic slag in the amount of 95.43 kg and sulphate-containing component, which is a mixture consisting of sodium sulphate 51.3% by mass, magnesium sulphate 46.9% by mass and sodium rhodonite 1.8% by mass, in the amount of 4.57 kg. The whiteness coefficient of the obtained additive is 99%, and its hydraulic activity is 24.97 mg.

On the basis of the obtained active mineral additive (30 wt. %), white Portland cement clinker (65 wt. %) with addition of gypsum (5 wt. %) binding material is produced having a compressive strength of 830 kgf/cm$^2$ (after 7 days of hardening) by joint grinding of the indicated components.

EXAMPLE 4

Sulphate-containing component in the amount of 5.31 kg, which is a mixture similar to the one described in Example 1, is added to a melt of phosphatic slag in the amount of 94.69 kg at a temperature of 1400°-1470° C.

The melt is homogenized and allowed to stand for 5-10 minutes. Thereafter the melt is poured into water.

The whiteness of the obtained active mineral additive amounts to 99%, its hydraulic activity determined by the absorption of $Ca(OH)_2$ from lime solution after 15 titrations is 24.9 mg.

On the basis of the obtained active mineral additive (40% by mass), white Portland cement clinker (55% by mass) with addition of gypsum (5% by mass) a binding material is produced having a compression strength of 713 kgf/cm$^2$ (after 7 days of hardening) by joint grinding of the indicated components.

EXAMPLE 5

Under conditions similar to those described in Example 1, active mineral additive is produced from granulated phosphatic slag in the amount of 94 kg and sulphate-containing component, having a composition similar to the one described in example 2, in the amount of 6 kg.

The whiteness coefficient of the obtained additive amounts to 100%. Its hydraulic activity determined b the absorption of $Ca(OH)_2$ from lime solution after 15 titrations is 24.14 mg.

The compression strength of the binding material produced in conditions similar to those indicated in Example 3 amounts to 830 kgf/cm$^2$ (after 7 days of hardening).

INDUSTRIAL APPLICABILITY

The present invention will find application in the production of cement, in particular: white and colored Portland cement, used for finishing buildings and various structures, Portland cement with mineral additives, Portland blast furnace cement and slag binding materials with improved properties.

Apart from this, the invention will find application in the manufacture of ceramic products and glass-crystalline materials with special properties.

We claim:

1. An active mineral additive for use in binding materials, said additive comprising granulated phosphatic slag in an amount of about 94–98% by mass and a sulphate-containing mixture in an amount of about 2–6% by mass, said sulphate-containing mixture consisting essentially of the following components in percent by mass:

| | |
|---|---|
| sodium sulphate | 47.2–57.6 |
| magnesium sulphate | 40.5–51.1 |
| sodium rhodonite | 1.70–1.90 |

2. An improved additive of the type comprising phosphatic slag, sodium sulphate and magnesium sulphate for use in a binding material, the improvement comprising an amount of sodium rhodonite effective to enhance the whiteness and hydraulic activity of said additive.

3. An additive as claimed in claim 2 wherein said additive has a whiteness coefficient of 96–100% on the absolute scale.

4. An additive as claimed in claim 3 wherein the additive has a hydraulic activity, determined by the absorption of $Ca(OH)_2$ from lime solution after 15 titrations, of 24.14–24.97 mg.

5. In a method for producing a binding material by combining an additive comprising phosphatic slag and a sulphate containing component with Portland cement and gypsum, the improvement comprising including in said sulphate containing component an amount of sodium rhodonite effective to enhance the whiteness and hydraulic activity of said binding material.

6. A method as claimed in claim 5 wherein said phosphatic slag is present in said additive in an amount of about 94–98% by mass and said sulphate containing component is present in said additive in an amount of about 2–6% by mass.

7. A method as claimed in claim 6 wherein the sulphate containing component consists essentially of sodium sulphate in an amount of 47.2–57.6% by mass, magnesium sulphate in an amount of 40.5–51.1% by mass and sodium rhodonite in an amount of 1.70–1.90 percent by mass.

* * * * *